(12) United States Patent
Chen et al.

(10) Patent No.: US 11,740,698 B2
(45) Date of Patent: Aug. 29, 2023

(54) ELECTRONIC DEVICE

(71) Applicant: Beijing Xiaomi Mobile Software Co., Ltd., Beijing (CN)

(72) Inventors: Jianli Chen, Beijing (CN); Qi Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 271 days.

(21) Appl. No.: 16/874,721

(22) Filed: May 15, 2020

(65) Prior Publication Data
US 2021/0216141 A1 Jul. 15, 2021

(30) Foreign Application Priority Data

Jan. 10, 2020 (CN) .......................... 202010026494.6

(51) Int. Cl.
*G06F 3/01* (2006.01)
*G06F 1/16* (2006.01)
*H02N 2/02* (2006.01)

(52) U.S. Cl.
CPC ............ *G06F 3/016* (2013.01); *G06F 1/1626* (2013.01); *G06F 1/1643* (2013.01); *H02N 2/02* (2013.01); *G06F 2203/04105* (2013.01)

(58) Field of Classification Search
CPC ...... G06F 3/016; G06F 1/1626; G06F 1/1643; G06F 2203/04105; G06F 3/0416;
(Continued)

(56) References Cited

U.S. PATENT DOCUMENTS 5,835,863 A * 11/1998 Ikenouchi ............. H04M 19/04
455/566
10,296,091 B2 * 5/2019 Heubel ............... G06F 3/04883
(Continued)

FOREIGN PATENT DOCUMENTS

CN 105843499 A 8/2016
CN 107885332 A 4/2018
(Continued)

OTHER PUBLICATIONS

Extended European Search Report dated Oct. 21, 2020 in European Patent Application No. 201832599, 6 pages.
(Continued)

*Primary Examiner* — Jeff Piziali
(74) *Attorney, Agent, or Firm* — Oblon, McClelland, Maier & Neustadt, L.L.P.

(57) ABSTRACT

The present disclosure relates to an electronic device, including a first motor, a second motor, a touch sensor, a pressure sensor, a processor, and a switching circuit. The pressure sensor is connected to the processor and is configured to generate a pressure value when sensing a pressing operation, and output the pressure value to the processor. The processor is connected to the switching circuit, and is configured to generate a trigger signal when the pressure value exceeds a set pressure threshold, and output the trigger signal to the switching circuit. The touch sensor is configured to sense position data of the pressing operation and output the position data to the switching circuit. The switching circuit is connected to the first motor and the second motor, respectively, and is configured to select the first motor or the second motor to vibrate according to the trigger signal and the position data.

4 Claims, 5 Drawing Sheets

(58) Field of Classification Search
CPC ............ G06F 3/01; H02N 2/02; H04M 19/04; H04M 1/026; H04M 19/047
See application file for complete search history.

(56) References Cited

U.S. PATENT DOCUMENTS

| | | | |
|---|---|---|---|
| 2009/0001916 A1 | 1/2009 | Wei et al. | |
| 2011/0163860 A1 | 7/2011 | Ryu et al. | |
| 2011/0260990 A1 | 10/2011 | Ally et al. | |
| 2014/0337033 A1 | 11/2014 | Kim | |
| 2017/0092084 A1* | 3/2017 | Rihn | G06F 3/167 |
| 2018/0232094 A1* | 8/2018 | Geng | G06F 3/0488 |

FOREIGN PATENT DOCUMENTS

| | | |
|---|---|---|
| CN | 108881615 A | 11/2018 |
| CN | 109189220 A | 1/2019 |
| CN | 110531852 A | 12/2019 |
| JP | 2007-86990 A | 4/2007 |
| JP | 2007-133698 A | 5/2007 |
| JP | 2013-150161 A | 8/2013 |
| KR | 10-2008-0075804 A | 8/2008 |
| KR | 10-2014-0085734 A | 7/2014 |
| KR | 10-2018-0044877 A | 5/2018 |
| WO | WO-2021091567 A1 * | 5/2021 |

OTHER PUBLICATIONS

Korean Office Action dated Jun. 29, 2021 in Korean Patent Application No. 10-2020-0062446 (with English translation), 8 pages
Japanese Office Action dated Jul. 9, 2021 in Japanese Patent Application No. 2020-088517 (with English translation), 6 pages.
Indian Office Action dated Jan. 6, 2022 in Indian Patent Application No. 202024025991, 7 pages.
Combined Chinese Office Action and Search Report dated May 16, 2022 in Chinese Patent Application No. 2020100264945, 6 pages.

* cited by examiner

ELECTRONIC DEVICE

CROSS-REFERENCE

The present application is based upon and claims the priority to the Chinese Patent Application No. 202010026494.6, filed on Jan. 10, 2020, the entire contents of which are hereby incorporated by reference as a part of the present application.

TECHNICAL FIELD

The present disclosure relates to the field of control technology, and in particular, to an electronic device.

BACKGROUND

At present, some mobile phones use a high-voltage motor driving chip to drive an X-axis linear motor in order to improve vibration experience of haptic feedback. In practical applications, when the X-axis linear motor is vibrating, only the vibration amount in vicinity of the motor is relatively strong. For example, when the X-axis linear motor is disposed at bottom of a mobile phone, only the vibration amount at the bottom of the mobile phone is relatively large, while the vibration amount at top of the mobile phone is very small, thereby affecting the user experience.

SUMMARY

The present disclosure provides an electronic device to solve the disadvantages of the related art.

According to aspects of the present disclosure, there is provided an electronic device including a first motor, a second motor, a touch sensor, a pressure sensor, a processor, and a switching circuit. The first motor is disposed at a first designated position of the electronic device, and the second motor is disposed at a second designated position of the electronic device. The pressure sensor is connected to the processor, and is configured to generate a pressure value when sensing a pressing operation, and output the pressure value to the processor. The processor is connected to the switching circuit and is configured to generate a trigger signal when the pressure value exceeds a set pressure threshold, and output the trigger signal to the switching circuit. Further, the touch sensor is configured to sense position data of the pressing operation and output the position data to the switching circuit. The switching circuit is connected to the first motor and the second motor, respectively, and is configured to select the first motor or the second motor to vibrate according to the trigger signal and the position data.

It should be note that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure

DETAILED DESCRIPTION

Exemplary embodiments will be described in detail herein, examples of which are illustrated in the accompanying drawings. The same numeral in different figures denotes the same or similar elements in the following description, unless otherwise indicated. The embodiments described in the following exemplary embodiments do not represent all embodiments consistent with the present disclosure. Instead, they are merely examples of devices and methods consistent with aspects of the present disclosure as detailed in the appended claims.

At present, some mobile phones use a high-voltage motor driving chip to drive an X-axis linear motor in order to improve vibration experience of haptic feedback. In practical applications, when the X-axis linear motor is vibrating, only the vibration amount in vicinity of the motor is relatively strong. For example, when the X-axis linear motor is disposed at bottom of a mobile phone, only the vibration amount at the bottom of the mobile phone is relatively large, while the vibration amount at the top of the mobile phone is very small, thereby affecting the user experience.

In order to solve the above technical problems, an embodiment of the present disclosure provides an electronic device. The inventive concept of the present disclosure is that a first motor is disposed at a first designated position (such as the top) of the electronic device, and a second motor is disposed at a second designated position (such as the bottom) of the electronic device. According to a pressing operation of a user, the motor at the position corresponding to the position of the pressing operation can be switched to vibrate to improve the user experience.

It should be noted that, in the embodiment of the present disclosure, the first motor and the second motor may be implemented by using a linear motor. Of course, a technician can also select other types of motors according to specific scenarios, and the corresponding solutions fall into the protection scope of the present disclosure.

Figure 1:
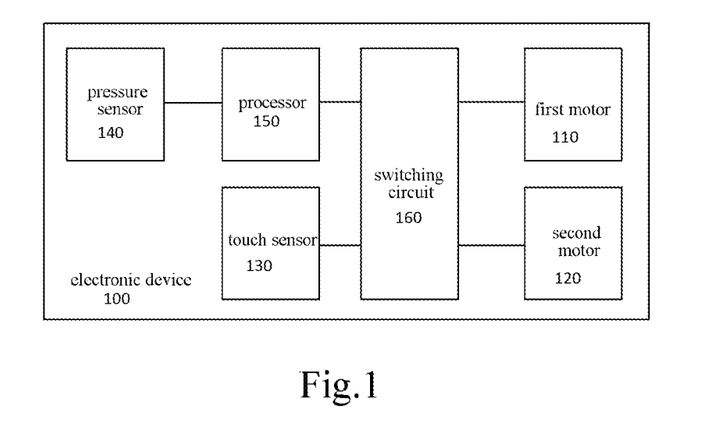
FIG. 1 is a block diagram showing an electronic device according to an exemplary embodiment.

FIG. 1 is a block diagram showing an electronic device 100 according to an exemplary embodiment. Referring to FIG. 1, the electronic device 100 includes a first motor 110, a second motor 120, a touch sensor 130, a pressure sensor 140, a processor 150, and a switching circuit 160. As shown, the pressure sensor 140 is connected to the processor 150, and is configured to generate a pressure value when sensing a pressing operation, and output the pressure value to the processor 150. The processor 150 is connected to the switching circuit 160, and is configured to generate a trigger signal when the pressure value exceeds a set pressure threshold, and output the trigger signal to the switching circuit 160.

The touch sensor 130 is configured to sense position data of the pressing operation and output the position data to the switching circuit 160. The switching circuit 160 is connected to the first motor 110 and the second motor 120, respectively, and is configured to select the first motor 110 or the second motor 120 to vibrate according to the trigger signal and the position data. In this embodiment, the first motor 110 is disposed at a first designated position of the electronic device 100, and the second motor 120 is disposed at a second designated position of the electronic device 100.

Figure 2:
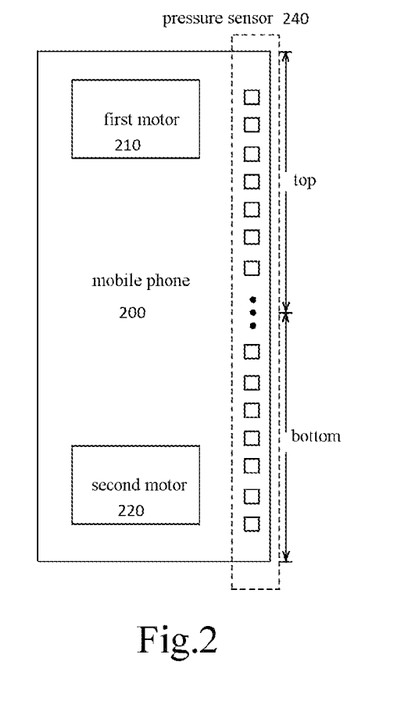
FIG. 2 is an effect diagram showing mounting positions of a first motor and a second motor according to an exemplary embodiment.

As shown in the exemplary embodiment of FIG. 2, the electronic device can be a mobile phone 200. When a display screen of the mobile phone 200 is directly facing the user, the first designated position may be the top of the mobile phone 200, and the second designated position may be the bottom of the mobile phone 200. Of course, a technician can set them according to the specific scenario, which is not limited here.

In addition, the triggering manners of the first motor 210 and the second motor 220 may include level triggering or edge triggering, and a suitable triggering manner will be selected later according to the specific scenario, which will not be described here.

In this embodiment, the pressure sensor 240 may be a strip sensor, or a sensor array formed by multiple sensors, which may be set according to a specific scenario, which is not limited herein.

In this embodiment, the touch sensor may be implemented by a touch screen of the electronic device, or may be implemented by a sensor disposed separately. The implementation form of the touch sensor may be selected according to a specific scenario, which is not limited herein. It should be noted that the touch sensor can be detected according to a set period, to obtain position data of the touch operation. Of course, the touch sensor can also be connected to a pressure sensor 240 (as shown by the dashed line in FIG. 1, this dashed line indicating that it is optional), and the touch sensor will only be triggered when the pressure sensor 240 outputs a pressure value, and obtain the position data. The technician can choose according to specific scenarios, which is not limited here.

In this embodiment, the switching circuit may be implemented by selecting devices according to a specific scenario, and select the first motor 210 or the second motor 220 to vibrate according to the trigger signal and the position data. The implementation of the switching circuit may include following manner.

Figure 3:
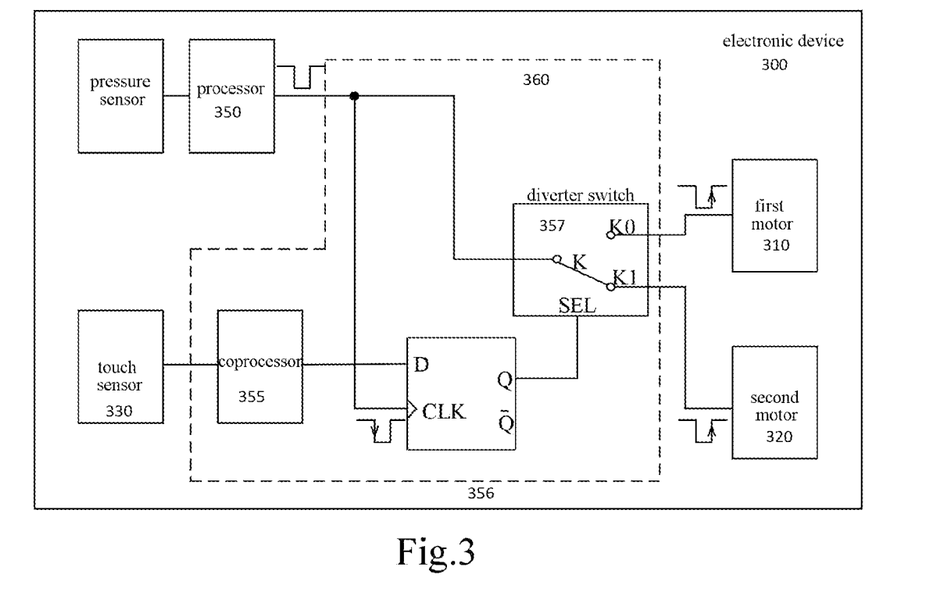
FIG. 3 is a schematic diagram showing a switching circuit implemented based on a D trigger according to an exemplary embodiment.

In an example, referring to FIG. 3, the switching circuit 360 may include a coprocessor 355, a D trigger 356, and a diverter switch 357. As shown, an input end of the D trigger 356 is connected to an output end of the coprocessor 355, a clock end of the D trigger 356 is connected to a control end of the processor 350, and an output end of the D trigger 356 is connected to an enable end of the diverter switch 357. Further, an input end of the diverter switch 357 is connected to a control end of the processor 350 (one of the output pins GPIO), a first output end (K0) of the diverter switch 357 is connected to the first motor 310, and a second output end (K1) of the diverter switch is connected to the second motor 320.

The coprocessor 355 is configured to generate a selection signal according to the position data, and output the selection signal to the input end of the D trigger 356. The D trigger 356 is configured to generate a switching signal based on the selection signal and the trigger signal and output the switching signal to the diverter switch 357. The diverter switch 357 is switched to the corresponding output end according to the switching signal. For example, when the switching signal is 0, the diverter switch 357 is switched to the first output end, and at this time, the diverter switch 357 turns on the first motor 310. Alternatively, when the switching signal is 1, the diverter switch 357 is switched to the second output end, and at this time, the diverter switch 357 turns on the second motor 320.

It should be noted that in this example, the coprocessor 355 may be implemented by the processor 350 of the electronic device 300, or may be implemented by a separate device having a processing function. In other words, in this example, the coprocessor 355 is only used to indicate the function of processing the position data of the touch sensor 330. It should be understood that a technician can choose the device for implementation according to the specific scenario when capable of achieving this function, and the corresponding solution falls within the protection scope of the present disclosure.

It should be noted that, taking into account operating habits of some users, such as holding the electronic device with both hands, the touch sensor can detect the finger in each detection, and output the position data of the finger to the coprocessor. Considering that when the user's finger changes from the holding state to the pressing operation state, the contact area between the finger and the touch sensor becomes larger. In this scenario, after obtaining the position data, the coprocessor can obtain the position data of the previous detection cycle, and then compare the pressing areas corresponding to the position data of the current detection cycle and the previous detection cycle. When the pressing area corresponding to the position data of the current detection cycle is larger than the pressing area corresponding to the position data of the previous detection cycle, that is, when the pressing area becomes larger, the coprocessor can determine whether the user's pressing position belongs to a region where the first designated position is located or a region where the second designated position is located, and generate a corresponding selection signal and output it to the diverter switch.

In this example, the D trigger 356 is triggered by a falling edge, for example, the falling edge of the negative pulse as shown in FIG. 3. That is, when the clock end CLK detects the falling edge of the trigger signal output by the processor 350, the states of the output end Q and the input end D of the D trigger 356 are the same. For example, if the pressing position belongs to the region where the second designated position is located, the selection signal may be "0", and if the switching signal outputted by the D trigger 356 may be "0", the diverter switch 357 is switched to the position of the first output end K0. For another example, if the pressing position belongs to the region where the first designated position is located, the selection signal may be "1", and if the switching signal outputted by the D trigger 356 may be "1", the diverter switch 357 is switched to the position of the second output end K1.

Considering that the trigger signal output by the processor 350 is simultaneously output to the D trigger 356 and the diverter switch 357, there may be a case where the D trigger 356 does not output the switching signal in time to cause that the diverter switch 357 is not switched to the correct output end. Therefore, the first motor 310 and the second motor 320 in this embodiment adopt a trigger manner of a rising edge, so that in a case where a width of the negative pulse is greater than the delay time of the D trigger 356, it can ensure that the motor in the region corresponding to the pressing operation vibrates, to improve the control accuracy As shown in the exemplary embodiment of FIG. 4, if the first motor 410 and the second motor 420 adopt a trigger manner of a low level, the switching circuit 460 may further include a timer 458. An input end of the timer 458 is connected to an output end of the processor 450, and an output end of the timer 458 is connected to an input end of the diverter switch 457 and is configured to delay a touch signal for a preset time period and output the delayed touch signal to the diverter switch 457. In the embodiment, it only needs that the preset time period is longer than the delay time of the D trigger 456.

Figure 5:
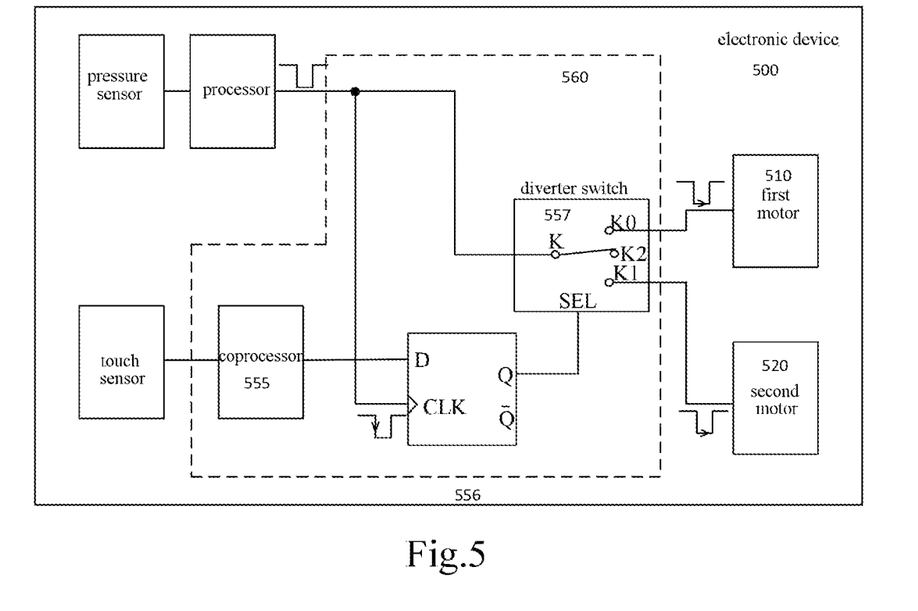
FIG. 5 is a schematic diagram showing still another switching circuit implemented based on a D trigger according to an exemplary embodiment.

FIG. 5 shows an example where the first motor 510 and the second motor 510 adopt the trigger manner of the low level, so the diverter switch 557 of the switching circuit 560 can be a single-pole three-throw switch. Referring to FIG. 5, a default position of the diverter switch 557 is at the third output end K2. After the D trigger 556 receives the switching signal, the diverter switch 557 can switch to the first output end KO or the second output end K1 according to the switching signal, and after holding for a certain time period, the diverter switch 557 can return to the default position. It can be understood that, due to the use of the single-pole three-throw switch, the first motor 510 and the second motor 520 can also be implemented with both the triggering manner of the rising edge and the triggering manner of the falling edge. The technician can choose according to the specific scenario, and the corresponding solutions fall into the protection scope of the present disclosure.

Figure 6:
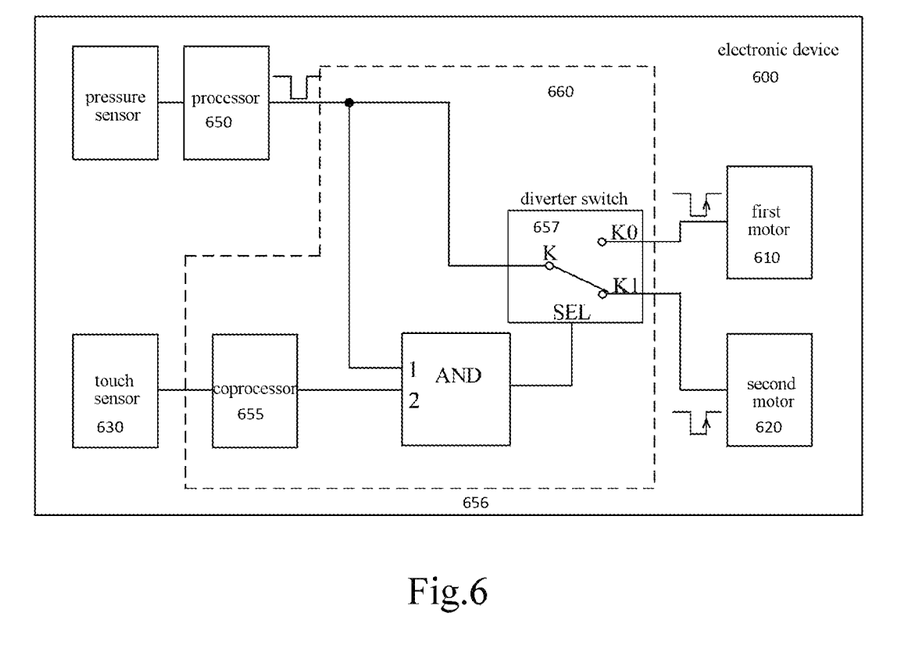
FIG. 6 is a schematic diagram showing a switching circuit implemented based on an AND gate according to an exemplary embodiment.

In another example, referring to FIG. 6, the switching circuit 660 includes a coprocessor 655, an AND gate and a diverter switch 657. A first end (represented by reference numeral 1) of the AND gate 656 is connected to an output end of the processor, a second end (represented by reference numeral 2) of the AND gate 656 is connected to an output end of the coprocessor 655, and an output end of the AND gate 656 is connected to an enable end (SEL) of the diverter switch 657.

An input end of the diverter switch 657 is connected to a control end of the processor 650, a first output end (K0) of the diverter switch 657 is connected to the first motor 610, and a second output end (K1) of the diverter switch is connected to the second motor 620. The coprocessor 655 is configured to generate a selection signal according to the position data, and output the selection signal to the second end of the AND gate 656.

The AND gate 656 is configured to generate a switching signal based on the selection signal and the trigger signal and output the switching signal to the diverter switch 657. The diverter switch 657 is switched to the corresponding output end according to the switching signal. For example, when the switching signal is 0, the diverter switch 657 is switched to the first output end, and at this time, the diverter switch 657 turns on the first motor 610. For another example, when the switching signal is 1, the diverter switch 657 is switched to the second output end, and at this time, the diverter switch turns on the second motor 620.

Considering that the trigger signal output by the processor 650 is simultaneously output to the AND gate 656 and the diverter switch 657, there may be a case where the AND gate 656 does not output the switching signal in time (due to the delay) to cause that the diverter switch 657 is not switched to the correct output end. Therefore, the first motor 610 and the second motor 620 in this embodiment adopt a trigger manner of a rising edge, so that in a case where the width of the negative pulse is greater than the delay time of the AND gate 656, it can ensure that the motor in the region corresponding to the pressing operation vibrates to improve the control accuracy.

Figure 7:
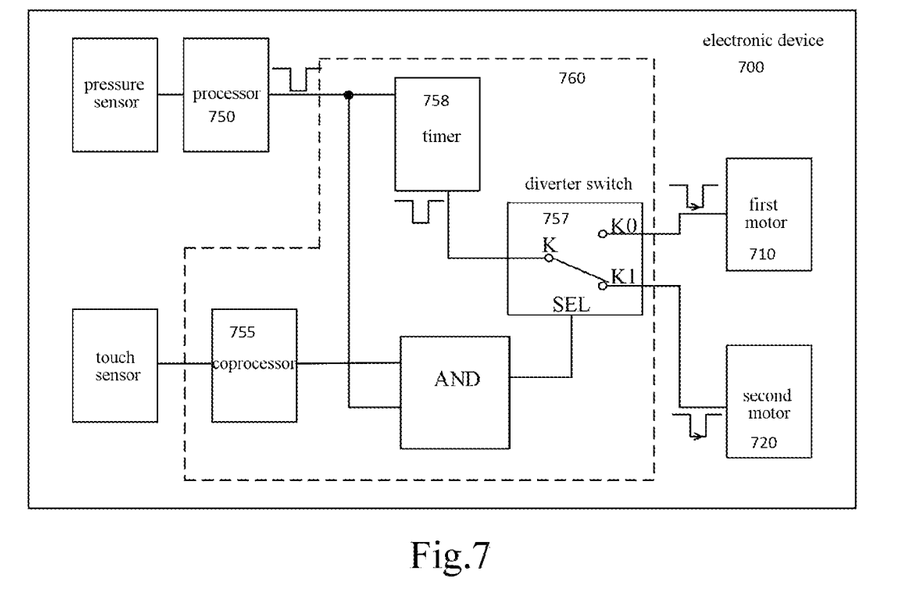
FIG. 7 is a schematic diagram showing another switching circuit implemented based on an AND gate according to an exemplary embodiment.

FIG. 7 shows another exemplary embodiment where the first motor 710 and the second motor 720 adopt a trigger manner of a low level, and the switching circuit 760 may further include a timer 758. An input end of the timer 758 is connected to an output end of the processor 750, and an output end of the timer is connected to an input end of the diverter switch 757 and is configured to delay a touch signal for a preset time period and output the delayed touch signal to the diverter switch 775. In the embodiment, it only needs that the preset time period is longer than the delay time of the D trigger.

Figure 8:
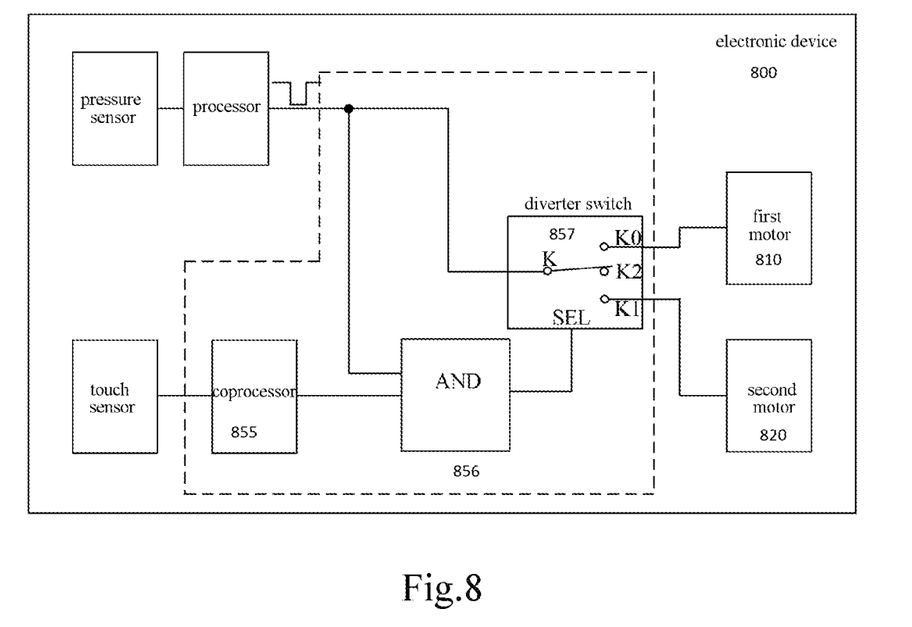
FIG. 8 is a schematic diagram showing still another switching circuit implemented based on an AND gate according to an exemplary embodiment.

In the example shown in FIG. 8, if the first motor 810 and the second motor 820 adopt the trigger manner of the low level, the diverter switch 857 can be a single-pole three-throw switch. Referring to FIG. 8, the default position of the diverter switch 857 is at the third output end K2. After the D trigger receives the switching signal, the diverter switch 857 can switch to the first output end K0 or the second output end K1 according to the switching signal, and after holding for a certain time period, the diverter switch 857 can return to the default position. It can be understood that, due to the use of the single-pole three-throw switch, the first motor 810 and the second motor 820 can also be implemented with both the triggering manner of the rising edge and the triggering manner of the falling edge. Of course, a technician can choose according to the specific scenario, and the corresponding solutions fall into the protection scope of the present disclosure.

Figure 4:
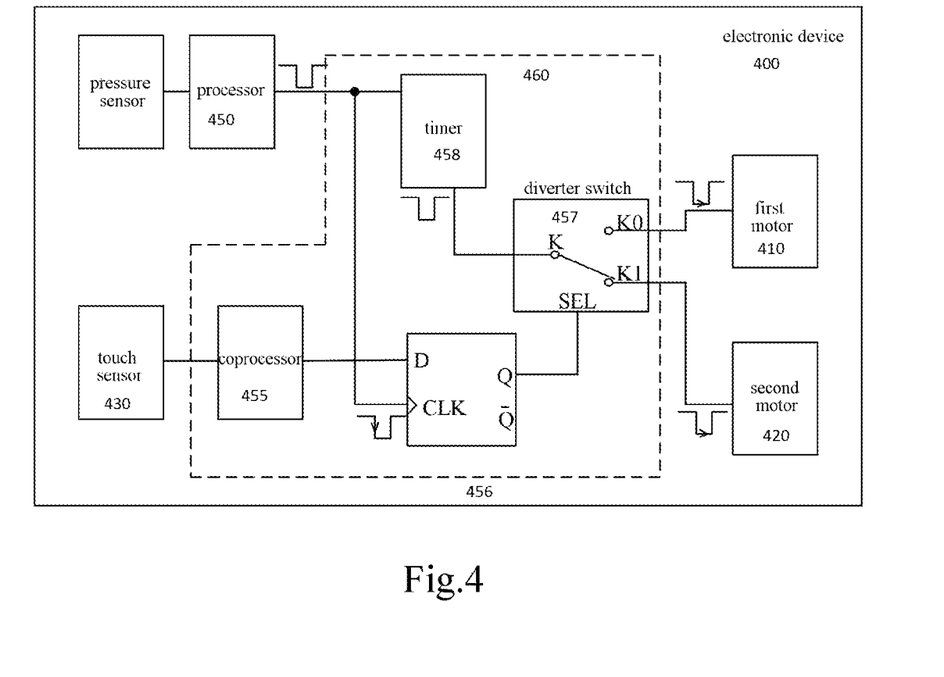
FIG. 4 is a schematic diagram showing another switching circuit implemented based on a D trigger according to an exemplary embodiment.

It should be noted that the examples shown in FIGS. 6 to 8 only introduce the differences from the examples shown in FIGS. 3 to 5, and the devices not described therein can be implemented by using the devices shown in FIGS. 3 to 5.

So far, by disposing the first motor at the first designated position of the electronic device and the second motor at the second designated position of the electronic device in the embodiment of the present disclosure, the switching circuit can select the first motor to vibrate or the second motor to vibrate according to the trigger signal and the position data. As such, when the pressure sensor is pressed, the corresponding motor in the electronic device can vibrate, so as to achieve the effect of vibrating at the first designated position or the second designated position of the electronic device, which is beneficial to improving the user experience.

An electronic device according to an embodiment of the present disclosure is described below with reference to FIGS. 2 and 3. Referring to FIGS. 2 and 3, when the user performs the pressing operation, the pressure sensor will detect the pressing operation and output the detected pressure value to the processor. The processor obtains a preset pressure threshold and compares the pressure value with the pressure threshold. When the pressure value is greater than the pressure threshold, the processor outputs a trigger signal. The trigger signal may be a negative pulse.

During the pressing operation, the touch sensor can detect the position of the pressing operation. A specific detection manner may refer to the related art, and details are not described herein again. The touch sensor can send the position data to the coprocessor. The coprocessor can generate a selection signal according to the current position data (or re-combining the previous position data). That is, when the pressing position belongs to the region where the first designated position is located, the selection signal is "0"; and when the pressing position belongs to the region where the second designated position is located, the selection signal is "1".

The D trigger adopts the falling edge triggering. When a falling edge of a negative pulse is detected, the value of the output end Q is the same as the selection signal at the input end D, that is, the value of the switching signal is the same as that of the selection signal. That is, when the selection signal is "0", the switching signal is "0"; and when the selection signal is "1", the switching signal is "1".

The diverter switch turns on the first motor when the switching signal is "0", or turns on the second motor when the switching signal is "1".

Because the first motor and the second motor are triggered by a rising edge, when the width of the negative pulse is greater than the delay time of the D trigger, the time when the diverter switch turns on the corresponding motor is earlier than the time when the corresponding motor receives the rising edge.

The switching signal being "0" is taken as an example, the diverter switch turns on the first motor, and the negative pulse is output to the first motor. The first motor performs a vibration operation when detecting a rising edge of the negative pulse. The vibration mode can be set according to a specific scenario, such as vibration for 200 ms, which is not limited herein.

The technical solutions provided by the embodiments of the present disclosure may include the numerous beneficial effects. For example, it can be known from the above embodiments that, by disposing the first motor at the first designated position of the electronic device and the second motor at the second designated position of the electronic device in the embodiment of the present disclosure, the switching circuit can select the first motor to vibrate or the second motor to vibrate according to the trigger signal and the position data. As such, when the pressure sensor is pressed, the corresponding motor in the electronic device can vibrate, so as to achieve the effect of vibrating at the first designated position or the second designated position of the electronic device, which is beneficial to improving the user experience.

Figure 9:
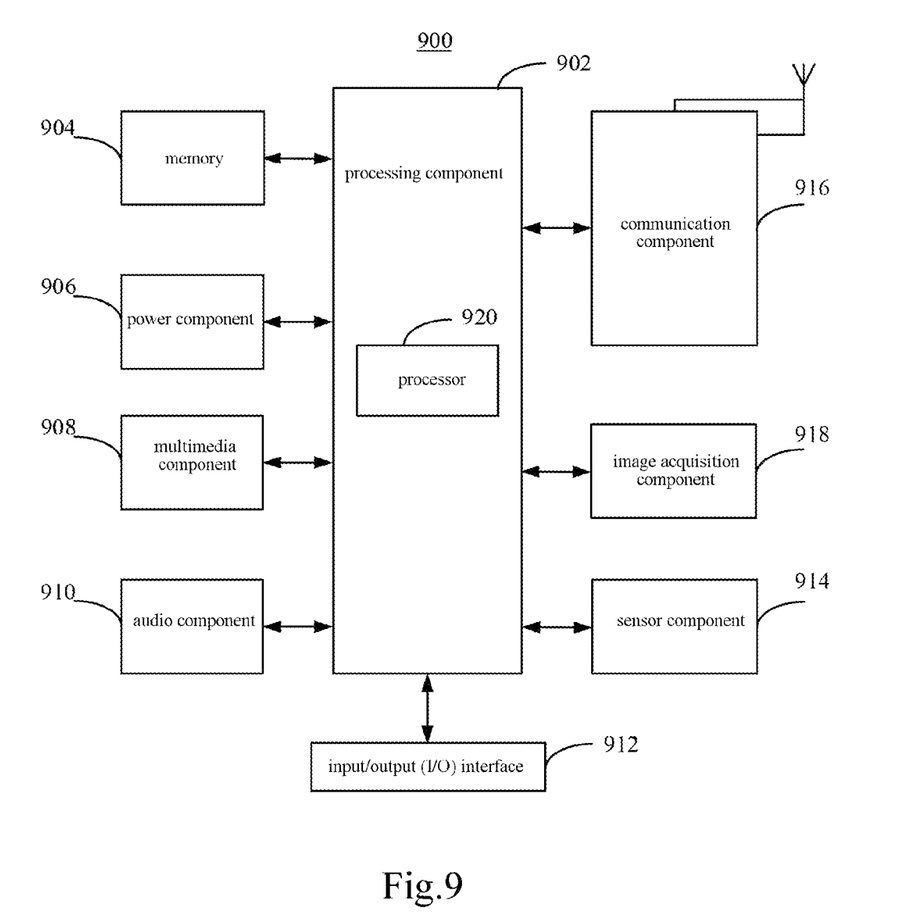
FIG. 9 is a block diagram showing an electronic device according to an exemplary embodiment.

FIG. 9 is a block diagram showing an electronic device according to an exemplary embodiment. For example, the electronic device 900 may be a smartphone, a computer, a digital broadcasting end, a tablet device, a medical device, a fitness device, and a personal digital assistant including a first motor disposed at a first designated position, a second motor disposed at a second designated position, and a switching circuit.

Referring to FIG. 9, the electronic device 900 may include one or more of the following components: a processing component 902, a memory 904, a power component 906, a multimedia component 908, an audio component 910, an input/output (I/O) interface 912, a sensor component 914, a communication component 916 and an image acquisition component 918.

The processing component 902 typically controls the overall operations of the electronic device 900, such as the operations associated with display, telephone calls, data communications, camera operations, and recording operations. The processing component 902 can include one or more processors 920 to execute instructions to perform all or part of the steps in the above described methods. Moreover, the processing component 902 can include one or more modules to facilitate the interaction between the processing component 902 and other components. For example, the processing component 902 can include a multimedia module to facilitate the interaction between the multimedia component 908 and the processing component 902.

The memory 904 is configured to store various types of data to support the operation of the electronic device 900. Examples of such data include instructions for any application or method operated on electronic device 900, such as the contact data, the phone book data, messages, pictures, videos, and the like. The memory 904 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the electronic device 900. The power component 906 can include a power management system, one or more power sources, and other components associated with the generation, management, and distribution of power in the electronic device 900.

The multimedia component 908 includes a screen providing an output interface between the electronic device 900 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 910 is configured to output and/or input an audio signal. For example, the audio component 910 includes a microphone (MIC) configured to receive an external audio signal when the electronic device 900 is in an operation mode, such as a call mode, a recording mode, and a voice recognition mode. The received audio signal may be further stored in the memory 904 or sent via the communication component 916. In some embodiments, the audio component 910 also includes a speaker for outputting the audio signal.

The I/O interface 912 provides an interface between the processing component 902 and peripheral interface modules, such as a keyboard, a click wheel, buttons, and the like.

The sensor component 914 includes one or more sensors for providing status assessments of various aspects of the electronic device 900. For example, the sensor component 914 can detect an open/closed status of the electronic device 900, relative positioning of components, such as the display and the keypad of the electronic device 900. The sensor component 914 can also detect a change in position of one component of the electronic device 900 or the electronic device 900, the presence or absence of user contact with the electronic device 900, an orientation, or an acceleration/deceleration of the electronic device 900, and a change in temperature of the electronic device 900.

The communication component 916 is configured to facilitate wired or wireless communication between the electronic device 900 and other devices. The electronic device 900 can access a wireless network based on a communication standard, such as WiFi, 2G or 3G, or a combination thereof. In an exemplary embodiment, the communication component 916 receives broadcast signals or broadcast associated information from an external broadcast management system via a broadcast channel In an exemplary embodiment, the communication component 916 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the electronic device 900 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In an exemplary embodiment, there is also provided a non-transitory computer-readable storage medium including executable instructions, such as a memory 904 including instructions. The executable instructions may be performed by the processor 920 of the electronic device 900. The above embodiments, they are performed by processors in the transmitting module and the receiving module. For example, the readable storage medium may be a ROM, a random access memory (RAM), a CD-ROM, a magnetic tape, a floppy disc, and an optical data storage device, or the like.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are merely illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. An electronic device, comprising:
   a first motor that is disposed at a first position of the electronic device;
   a second motor is disposed at a second position of the electronic device;
   a pressure sensor that is configured to generate a pressure value when sensing a pressing operation;
   a processor coupled to the pressure sensor that is configured to generate a trigger signal when the pressure value exceeds a set pressure threshold;
   a touch sensor that is configured to sense position data of the pressing operation; and
   a switching circuit that is connected to the first motor and the second motor respectively, and configured to select the first motor or the second motor to vibrate according to the trigger signal and the position data,
   wherein the switching circuit further comprises a coprocessor, a D trigger, and a diverter switch,
   wherein an input end of the D trigger is connected to an output end of the coprocessor, a clock end of the D trigger is connected to a control end of the processor, and an output end of the D trigger is connected to an enable end of the diverter switch,
   an input end of the diverter switch is connected to a control end of the processor, a first output end of the diverter switch is connected to the first motor, and a second output end of the diverter switch is connected to the second motor,
   the coprocessor is configured to generate a selection signal according to the position data, and output the selection signal to the input end of the D trigger, and
   the D trigger is configured to generate a switching signal based on the selection signal and the trigger signal, and output the switching signal to the diverter switch, so that the diverter switch turns on the first motor or the second motor.

2. The electronic device according to claim 1, wherein the trigger signal is a negative pulse signal, the D trigger is triggered by a falling edge, the first motor and the second motor are triggered by a rising edge, and the diverter switch adopts a single-pole double-throw switch.

3. The electronic device according to claim 1, wherein the trigger signal is a negative pulse signal, the D trigger is triggered by a falling edge, the first motor and the second motor are triggered by a low level, and the diverter switch adopts a single-pole three-throw switch.

4. The electronic device according to claim 1, wherein the diverter switch further comprises a timer, an input end of the timer is connected to an output end of the processor, and an output end of the timer is connected to an input end of the diverter switch and is configured to delay a touch signal for a preset time period and output the delayed touch signal to the diverter switch.

\* \* \* \* \*